United States Patent [19]

Kushida et al.

[11] Patent Number: 4,610,233
[45] Date of Patent: Sep. 9, 1986

[54] FUEL INJECTION SYSTEM FOR INTERNAL COMBUSTION ENGINE

[75] Inventors: Takeo Kushida; Tsuneyuki Chiyoda; Keiichi Yamada, all of Higashi-Matsuyama, Japan

[73] Assignee: Diesel Kiki Co., Ltd., Tokyo, Japan

[21] Appl. No.: 716,129

[22] Filed: Mar. 25, 1985

[30] Foreign Application Priority Data

Apr. 5, 1984 [JP] Japan .................. 59-49872[U]

[51] Int. Cl.⁴ .......................................... F02M 39/00
[52] U.S. Cl. .................................... 123/458; 123/357
[58] Field of Search .............. 123/449, 458, 459, 511, 123/512, 357, 494

[56] References Cited

U.S. PATENT DOCUMENTS

| | | | |
|---|---|---|---|
| 3,896,779 | 7/1975 | Omori et al. .................. | 123/449 |
| 4,475,507 | 10/1984 | Miyaki et al. ................. | 123/458 |
| 4,494,507 | 1/1985 | Yasuhara ....................... | 123/357 |
| 4,520,780 | 6/1985 | Ito et al. ........................ | 123/458 |
| 4,523,569 | 6/1985 | Seilly et al. ................... | 123/458 |

FOREIGN PATENT DOCUMENTS

| | | | |
|---|---|---|---|
| 44744 | 3/1982 | Japan ............................. | 123/449 |
| 2086080 | 5/1982 | United Kingdom ........... | 123/458 |

Primary Examiner—Magdalen Y. C. Greenlief
Attorney, Agent, or Firm—Wenderoth, Lind & Ponack

[57] ABSTRACT

A fuel injection system for in internal combustion engine includes a solenoid valve disposed across a fuel passage defined in a fuel injection pump and actuatable under the control of a control circuit for controlling the fuel injection quantity and the fuel injection timing. The actual fuel injection quantity is detected by a sensor disposed in the solenoid valve and fed back to the electric circuit where it is compared with the objective fuel injection quantity determined on the basis of engine operating conditions. If there is a difference, the fuel injection quantity supplied to the internal combustion engine through the solenoid valve is changed by the control circuit in a measured manner which will tend to make this difference disappear. The control of the fuel injection timing can be achieved by the system substantially the same manner as described above. The sensor comprises an electric on-off switch defined jointly by a valve seat and a valve element of the solenoid valve.

3 Claims, 4 Drawing Figures

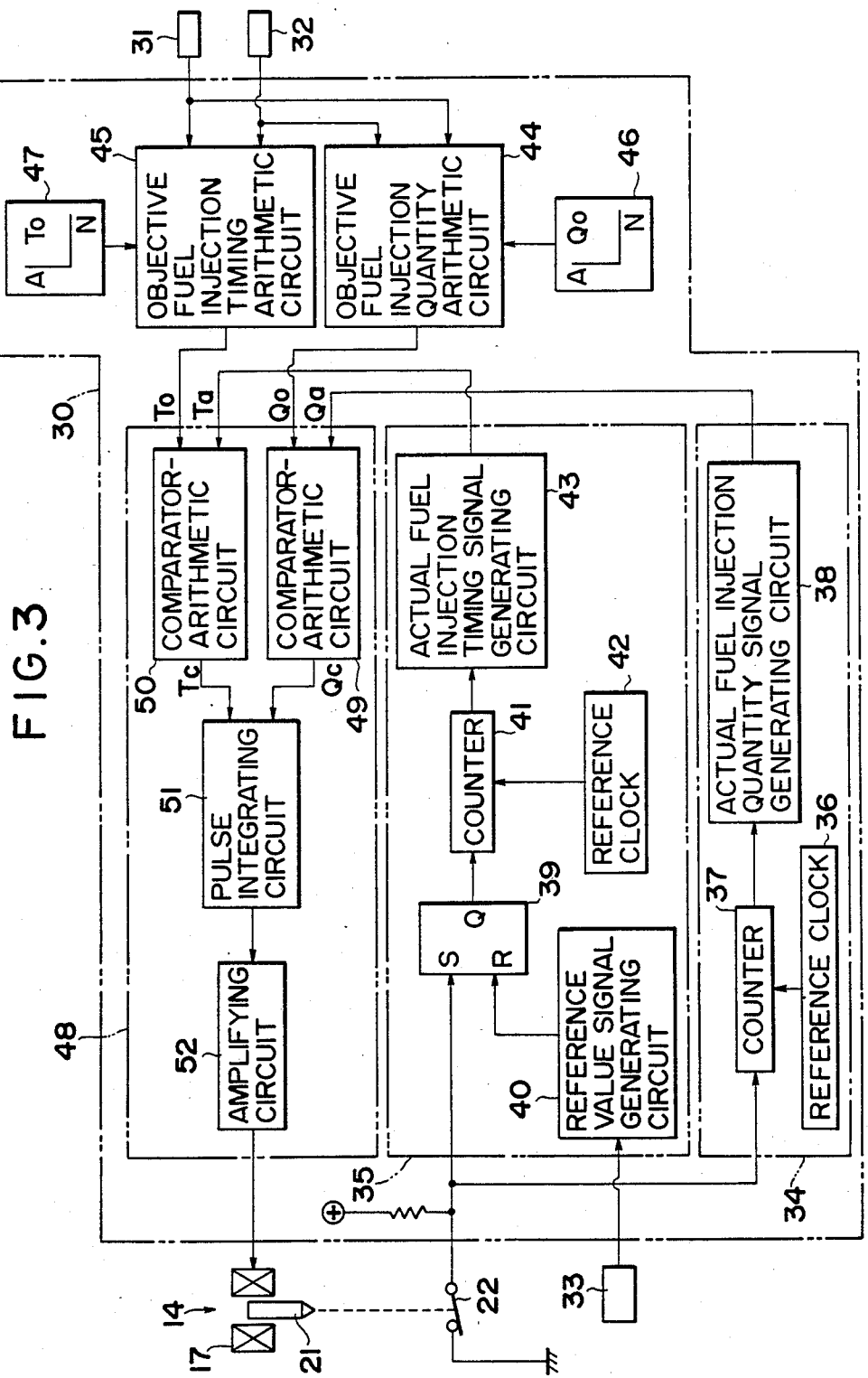

FUEL INJECTION SYSTEM FOR INTERNAL COMBUSTION ENGINE

FIELD OF THE INVENTION

The present invention relates generally to a fuel injection system for use with an internal combustion engine, and more particularly to such a fuel injection system including a fuel injection pump which is contributable to improvement in the control of the fuel injection quantity and the fuel injection timing.

RELATED ART

Fuel injection systems are known in which a solenoid valve is disposed across a fuel supply line in a fuel injection pump for opening and closing the fuel supply line to thereby control the fuel injection quantity. According to one such known fuel injection system disclosed in Japanese Patent Laid-open publication No. 59-192928, the opening and closing timing of the solenoid valve is adjusted by an output signal from the control circuit which is determined on engine operating conditions. However, the actual valve opening and closing timing can also be changed as the circumferential temperture or the like factor varies. A problem of the disclosed system is in that the actual valve opening and closing timing is not detected and hence an accurately controlled fuel injection is difficult to achieve.

SUMMARY OF THE INVENTION

It is therefore an object of the present invention to provide a fuel injection system for an internal combustion engine, which overcomes the aforesaid drawback of the prior art systems and can control the fuel injection quantity and the fuel injection timing with accuracy.

Briefly stated, a fuel injection system according to the invention includes a solenoid valve disposed across a fuel passage defined in a fuel injection pump and actuatable under the control of a control circuit for controlling the fuel injection quantity and the fuel injection timing. The actual fuel injection quantity is detected by a sensor disponsed in the solenoid valve and fed back to the electric ciecuit where it is compared with the objective fuel injection quantity determined on the basis of engine operating conditions. If there is a difference, the fuel injection quantity supplied to the internal combustion engine through the solenoid valve is changed by the control circuit in a measured manner which will tends to make this difference disappear. The control of the fuel injection timing can be achieved by the system substantially the same manner as described above.

Stated more specifically, according to the invention, there is provided a fuel injection system for an internal combustion engine, comprising:

(a) a fuel injection pump operative to inject fuel into the internal combustion engine and having a fuel passage defined therein;

(b) a solenoid valve disposed across said fuel passage to perform a periodic valve opening and closing action for controlling the flow of fuel passing thereacross;

(c) first means disposed in said solenoid valve for electrically detecting said valve opening and closing operation;

(d) second means for electrically detecting an engine operating condition of the internal combustion engine; and (e) a control circuit connected with said first and second detecting means and said solenoid valve for controlling said valve opening and closing operation of said solenoid valve on the basis of said engine operating condition detected and said valve opening and closing action detected.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 3 is a block diagram of a control circuit of the fuel injection system.

DETAILED DESCRIPTION

Figure 1:
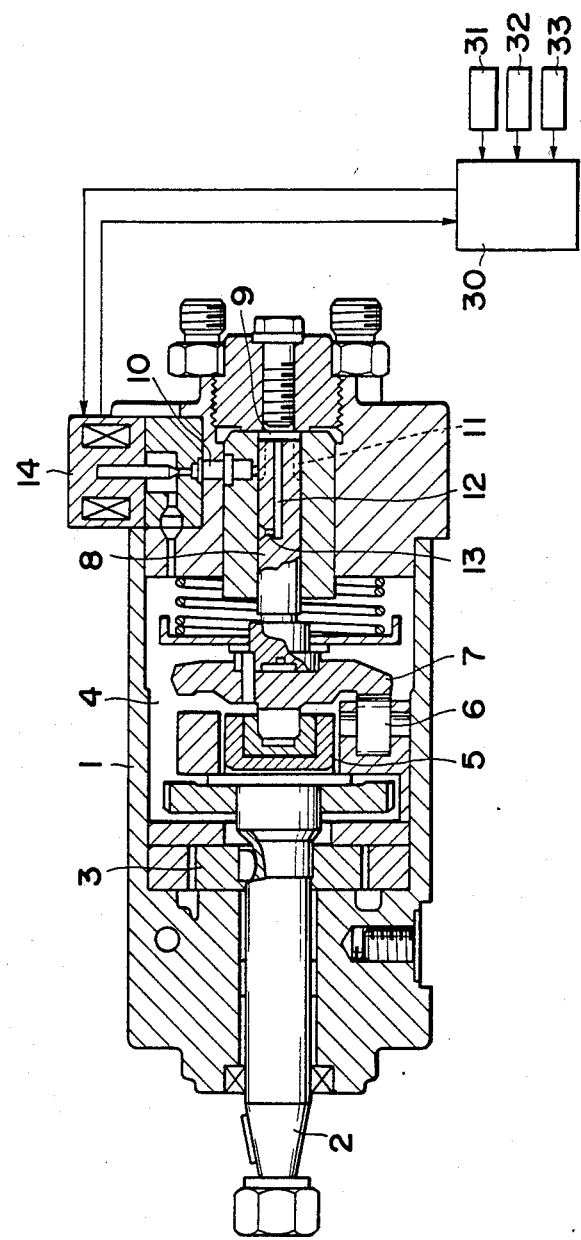
FIG. 1 is a schematic view, partly in cross section, of a fuel injection system according to the present invention.

FIG. 1 shows a fuel injection system constructed in accordance with the present invention. The system comprises a distributor-type fuel injection pump including a housing 1 and a pump drive shaft 2 rotatably mounted therein. The drive shaft 2 is connected to and drive by a crankshaft of the internal combustion engine such as diesel engine, not shown, to rotate at a predetermined speed reduction ratio, for instance, 2:1. A feed pump comprises a vane pump 3 mounted on the drive shaft 2 for coratation therewith so as to to feed fuel into a fuel chamber 4 defined in the housing 1. The drive shaft 2 has one end connected by a coupling 5 to a cam disk 7 mounted on one end of a plunger 8 slidably fitted in an end portion of the housing 1. The cam disk 7 has a cam surface urged against a roller 6 disposed within the housing 1, so that the cam disk 7 and accordingly the plunger 8 is caused by rotation of the drive shaft 2 to simultaniously rotate and reciprocate. The plunger 8 defines, jointly with the housing 1, a pump working chamber or plunger chamber 9 and has a plurality of axial notches 11 opening at one end to the plunger chamber 9, the opposite end of each notch 11 being adapted to communicate with a fuel suply line or passage 10 provided in the housing 1. The plunger 8 further has a central axial bore 12 opening at one end to the plunger chamber 9, the other end portion of the bore 12 communicating with one end of a side delivery opening 13 which is adapted to be communicated at the opposite end with a plurality of delivery passages, not shown, in the housing 1. A solenoid valve 14 is disposed across the fuel supply passage 10 and actuatable for opening and closing the passage 10 to thereby control the amount of fuel sucked from the fuel chamber 4 into the plunger chamber 9.

Figure 2:
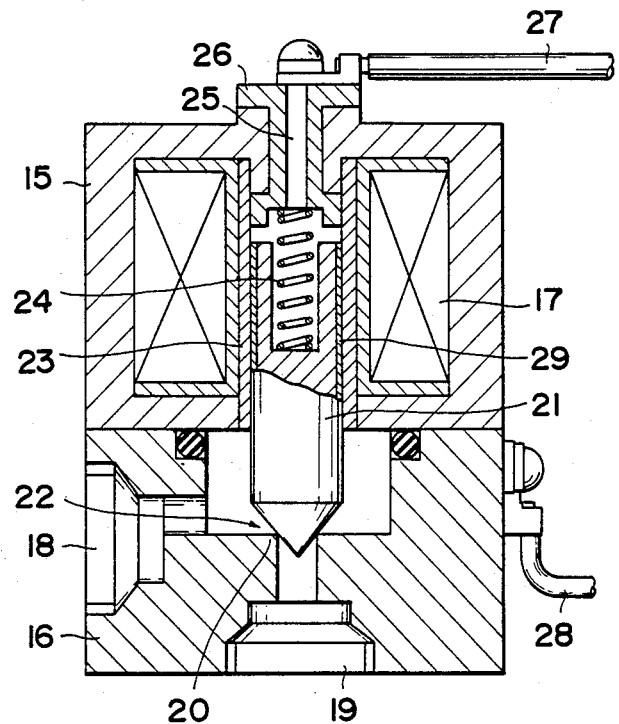
FIG. 2 is an enlarged cross-sectional view of a solenoid valve incorporated in the fuel injection system of FIG. 2.

As shown in FIG. 2, the solenoid valve 14 includes an upper case 15 and a lower housing 16 joined together, the upper case 15 having a coil 17 of insulated wire mounted centrally therein for producing a magnetic field within the coil 17 when energized. The valve housing 16 is made of a conductive material such as metal and has a horizontal inlet port 18 and a vertical outlet port 19 held in fluid communication with each other through a recess or chamber provided in an upper portion of the housing 16. The inlet and outlet ports 18, 19 permanently communicate with the fuel supply passage 10. The one or bottom wall of the recess, at which the outlet port 19 opens, constitutes a valve seat 20 onto which a plunger or valve element 21 is seated. The valve seat 20 and the valve element 21 jointly define an on-off switch 22 for the purpose described hereinbelow in detail. The valve element 21 is slidably fitted in a guide sleeve 23 mounted centrally in the case 15 in alignment with the outlet port 19, the coil 17 being disposed around the guide sleeve 23. The valve element 21 is normally urged downwardly against the valve seat 20 by means of a compression coil spring 24 disposed in an axial upper hole in the valve element 21. The coil spring 24 is made of a conductive material such as metal and has an upper end held in engagement with an electrode 25. The electrode 25 is fitted in an insulating sleeve 26 fixedly mounted in the case 15. The electrode 25 thus fitted is insulated from the case 15 by the insulating sleeve 26 interposed therebetween. A pair of conductors or wires 27, 28 is connected to the housing 16 and the electrode 25, respectively. One wire 27 is connected to a control circuit 30 described below and the other 28 is grounded. The valve element 21 is composed of a cylindrical body of a conductive material, and a layer 29 of an insulating material such as ceramics provided on the outer surface of the body through the ion-plating process, for instance. The insulating layer 29 extends substantially the full length of a longitudinal portion of the body which is received in the guide sleeve 23, thereby insulating the valve element 21 from the case 15.

The solenoid valve 14 operates as follows: While the coil 17 is de-energized, as shown in FIG. 2, the valve element 21 is seated on the valve seat 20 to close the outlet port 19, thereby interrupting the flow of fuel from the inlet port 18 toward the outlet port 18. Since the valve 14 is closed, the switch 22 is closed, completing an electric circuit passing across the switch 22 via the wire 27, the electrode 25, the spring 24, the valve element 21, the housing 16 and the wire 28. When the coil 17 is energized to produce a magnetic field therewithin, the valve element 21 is pulled or moved upwardly away from the valve seat 20 against the bias of the coil spring 24. This movement of the valve element 21 permits the fuel to flow from the inlet port 18 into the outlet port 18. Since the valve 14 is opened, the switch 22 is opened.

The control circuit 30 is connected in circuit with a plurality of sensors 31, 32, 33 for receiving therefrom respective signals representing engine operating conditions. The sensor 31 is an engine rpm sensor for detecting the engine rpm and sends a signal representing the detected engine rpm to the control circuit 30. The sensor 32 acts as a load sensor for detecting the position of an accelerating pedal (not shown) as the engine load and sending a signal indicative of the detected engine load to the control circuit 30. The sensor 33 is a reference value sensor for detecting the upper dead point of an engine piston (not shown) as a reference value and sending the detected reference value to the control circuit 30. The switch 22 is connected to the control circuit 30 so that a signal representing the actual opening and closing action of the solenoid valve 14 is fed back to the control circuit 30. Thus the switch 22 acts as a valve opening and closing action sensor. The control circuit 30 processes such input signals through arithmetical operation and amplification to thereby produce output signals which periodicaly engergize and de-energize the coil 17 of the solenoid valve 14 to open and close the latter.

As shown in FIG. 3, the control circuit 30 comprises an actual fuel injection quantity arithmetic means 34 for computing the actual fuel injection quantity on the basis of the actual opening and closing action of the switch 22, and an actual fuel injection timing arithmetic means 35 for computing the actual fuel injection timing. The actual fuel injection quantity arithmetic means 34 includes a reference clock 36 for generating reference clock pulses, and a first counter 37 for counting the number of clock pulses received from the clock 36. The switch 22 is connected with the counter 37 to supply the same with pulses having a given pulse width corresponding to the opening and closing action of the switch 22. The counter 37 is set or started at the leading edge of each pulse and reset or stopped at the trailing edge of the same pulse, thereby producing an output signal corresponding to the actual fuel injection quantity. The output signal is supplied with an actual fuel injection quantity signal generating circuit 38 such as a D/A converter which produces an analog output signal having a value Qa corresponding to the actual fuel injection quantity. In the illustrated embodiment, the value Qa is computed on the basis of the amount of fuel sucked into the plunger chamber 9. The actual fuel injection timing arithmetic means 35 includes an R-S flip-flop 39 adapted to be set when the switch 22 is opened. The flip-flop 39 is reset at the leading edge of a reference signal pulse supplied from the reference value sensor 33 via a reference value signal generating circuit 40. Thus a pulse having a pulse width corresponding to the actual fuel injection timing is supplied from the output terminal Q of the flip-flop 39 to a second counter 41. The second counter 41 counts the number of pulses supplied from a second reference clock 42 and supplies a signal corresponding to the actual fuel injection timing to an actual fuel injection timing signal generating circuit 43 which is composed of a D/A converter. The actual fuel injection timing signal generating circuit 43 produces an analog output signal having a value Ta corresponding to the actual fuel injection timing. In the illustrated embodiment, the value Ta is computed on the basis of the sucking timing of fuel into the plunger chamber 9.

The control circuit 30 further includes an objective fuel injection quantity arithmetic circuit 44 and an objective fuel injection timing arithmetic circuit 45. The circuit 44 computes the objective fuel injection quantity on the basis of the output signal of the rpm sensor 31 and the output signal of the load sensor 32, while the circuit 45 computes the objective fuel injection timing on the basis of the outputs of the respective sensors 31, 32. The arithmetic means 44 reads out the the map data stored in a first area 46 of a ROM (read-only memory) and produces the objective fuel injection quantity Qo through the mapping operation. Likewise, the arithmetic means 45 reads out the map data stored in a second area 47 of the ROM and produces the objective fuel injection timing To through the mapping operation.

Figure 4:
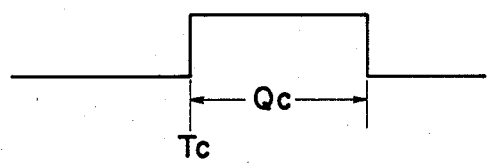
FIG. 4 is a diagrammatic view showing the waveform of an output signal from a pulse integrating circuit.

The control circuit 30 further has a control signal arithmetic means 48 for computing a control signal to be supplied to the coil 17 of the solenoid valve 14, on the basis of the computed results of the actual fuel injection quantity arithmetic means 34, the actual fuel injection timing means 35, the objective fuel injection quantity arithmetic means 44 and the objective fuel injection timing arithmetic means 45. The control signal arithmetic means 48 includes two comparator-arithmetic circuits 49, 50. The one or first comparator-arithmetic circuit 49 compares the objective fuel injection quantity Qo supplied from the arithmetic means 44, and the actual fuel injection quantity Qa supplied from the arithmetic means 34, and if there is a difference, it computes the correct fuel injection quantity Qc through the correction or compensation of the objective fuel injection quantity Qo in the light of the actual fuel injection quantity Qa. The first comparator-arithmetic circuit 49 produces an output pulse having a pulse width corresponding to the correct fuel injection quantity Qc. Likewise, the second comparator-arithmetic circuit 50 compares the objective fuel injection timing To supplied from the corresponding arithmetic means 45 and the actual fuel injection timing Ta supplied from the corresponding arithmetic means 35, and if there is a difference, it computes the correct fuel injection timing Tc through the correction or compensation of the objective fuel injection timing To in the light of the actual fuel injection timing Ta. The second comparator-arithmetic circuit 50 produces an output pulse whose rising timing or leading edge corresponds to the correct fuel injection timing Tc. The output pulses from the comparator-arithmetic circuits 49, 50 are supplied to a pulse integrating circuit 51 where the output pulses are integrated into a single pulse. The integrated pulse, as shown in FIG. 4, has the leading edge or a rising timing corresponding to the correct fuel injection timing Tc and a pulse width corresponding to the correct fuel injection quantity Qc. The integrated pulse is amplified by an amplifying circuit 52 and then supplied therefrom to the coil 17 of the solenoid valve 14. Arthmetic operation is achieved as follows: On receipt of the signals from the sensors 31, 32, the objective fuel injection timing To is computed through mapping operation; then the objective fuel injection quantity Qo is computed through mapping operation; the value of the counter 37 is converted to Qa; the value of the counter 41 is converted to Ta; Tc is computed by Eq. $Tc = f_1(To, Ta)$, Ta depending on the preceding To, i.e. $Ta = f_2(\text{pre To})$; and Qc is computed by Eq. $Qc = f_3(Qo, Qa)$, Qa depending on the preceding Qo, i.e. $Qa = f_4 (\text{pre Qo})$. With this arrangement, if the opening and closing timing of the solenoid valve 14 is changed with a change in the circumferential temperature, such change can immediately be compensated.

Although in the illustrated embodiment, the solenoid valve 14 is disposed across the fuel supply passage 10, the valve may be disposed across a fuel leak passage for opening and closing the latter to thereby control the fuel leakage. Such leakage control arrangement is disclosed in the Japanese Patent Laid-open Publication No. 58-190560.

As described above, according to the present invention, the actual opening and closing action of the solenoid valve is detected and fed back to the control circuit for stable and accurate operation of the solenoid valve itself. Accordingly, if there is any change in the valve opening and closing action caused by a change in the circumferential temperature or the like factor, such change is immediately be compensated, with the result that the fuel injection quantity and the fuel injection timing can be controlled accurately. Since the solenoid valve contains a switch defined by the valve element and the valve seat, the actual valve opening and closing action can be detected with utmost ease. Switching signals from the switch are supplied directly to the control circuit so that a simple input portion is available for the control circuit.

Obviously, many modifications and variations of the present invention are possible in the light of the above teachings. It is therefore to be understood that within the scope of the appended claims, the invention may be precticed otherewise than as specifically described.

What is claimed is:

1. A fuel injection system for an internal combustion engine, comprising:
   (a) a fuel injection pump operative in inject fuel into the internal combustion engine and having a fuel passage defined therein;
   (b) a solenoid valve disposed across said fuel passage to perform a periodic valve opening and closing action for controlling the flow of fuel passing thereacross;
   (c) first means disposed in said solenoid valve for electrically detecting said valve opening and closing operation;
   (d) second means for electrically detecting an engine operating condition of the internal combustion engine; and
   (e) a control circuit connected with said first and second detecting means and said solenoid valve for controlling said valve opening and closing operation of said solenoid valve on the basis of said engine operating condition detected and said valve opening and closing action detected;
   said first detecting means comprising an electric on-off switch adapted to be opened and closed in synchronism with said valve opening and closing action of said solenoid valve;
   said solenoid valve including a valve chamber held in fluid communication with said fuel passage, a valve seat of conductive material facing said valve chamber, and a valve element of conductive material reciprocably movable toward and away from said valve seat to keep said valve chamber in and out of fluid communication with said fuel passage, said electric switch being jointly defined by said valve seat and said valve element.

2. A fuel injection system according to claim 1, said solenoid valve further including a case and a housing secured together to define therebetween said valve chamber, said housing being made of a conductive material and having said valve seat, said valve element being slidably mounted in said case and electrically insulated therefrom, an electrode fixedly mounted in said case in alignment with said valve element and electrically insulated from said case, and a spring member of conductive material disposed between said electrode and said valve element for urging the latter against said valve seat.

3. A fuel injection system according to claim 2, said valve element having a longitudinal portion slidable engagable with said case, and a layer of insulating material provided over the outer surface of said longitudinal portion of said valve element.

* * * * *